(12) United States Patent
Miyakawa

(10) Patent No.: US 10,875,586 B2
(45) Date of Patent: Dec. 29, 2020

(54) TRUCK SIDE-SKIRT

(71) Applicant: VOLVO TRUCK CORPORATION, Gothenburg (SE)

(72) Inventor: Sayaka Miyakawa, Saitama (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 211 days.

(21) Appl. No.: 16/063,177

(22) PCT Filed: Dec. 21, 2015

(86) PCT No.: PCT/JP2015/085670
§ 371 (c)(1),
(2) Date: Jun. 15, 2018

(87) PCT Pub. No.: WO2017/109831
PCT Pub. Date: Jun. 29, 2017

(65) Prior Publication Data
US 2019/0308675 A1   Oct. 10, 2019

(51) Int. Cl.
*B62D 35/00* (2006.01)
*B60R 19/56* (2006.01)
*B62D 35/02* (2006.01)

(52) U.S. Cl.
CPC ............ *B62D 35/001* (2013.01); *B60R 19/56* (2013.01); *B60R 19/565* (2013.01); *B62D 35/008* (2013.01); *B62D 35/02* (2013.01)

(58) Field of Classification Search
CPC .. B62D 35/001; B62D 35/002; B62D 35/008; B62D 35/02; B60R 19/565
See application file for complete search history.

(56) References Cited

U.S. PATENT DOCUMENTS

| | | | | |
|---|---|---|---|---|
| 4,746,160 A | * | 5/1988 | Wiesemeyer | B62D 35/001 105/1.1 |
| 5,280,990 A | * | 1/1994 | Rinard | B62D 35/001 296/180.1 |
| 9,463,759 B1 | * | 10/2016 | Kiefer | B60R 19/565 |

(Continued)

FOREIGN PATENT DOCUMENTS

| | | |
|---|---|---|
| JP | S5544009 A | 3/1980 |
| JP | 224787 | 2/1990 |

(Continued)

OTHER PUBLICATIONS

International Search Report (dated Mar. 22, 2016) for corresponding International App. PCT/JP2015/085670.

(Continued)

*Primary Examiner* — Gregory A Blankenship
(74) *Attorney, Agent, or Firm* — Withrow & Terranova, PLLC

(57) ABSTRACT

In a truck having a plate-like side guard disposed at each of the right and left side faces of a vehicle body and arranged apart from the lower face of a cargo bed, a flexible sheet having a rectangular shape is attached between the cargo bed and the side guard. The sheet has one end portion in the vertical direction secured to one of the cargo bed and the side guard, and the other end portion in the vertical direction, detachably fastened to the other of the cargo bed and the side guard.

11 Claims, 6 Drawing Sheets

(56) References Cited

U.S. PATENT DOCUMENTS

| | | | |
|---|---|---|---|
| 2006/0152038 A1* | 7/2006 | Graham | B60R 19/565 296/180.1 |
| 2007/0176466 A1* | 8/2007 | Dolan | B62D 35/001 296/203.03 |
| 2008/0231079 A1* | 9/2008 | Grady | B62D 35/001 296/191 |
| 2009/0212595 A1* | 8/2009 | Heppel | B62D 25/168 296/180.4 |
| 2010/0264690 A1* | 10/2010 | Brown | B62D 25/168 296/180.4 |
| 2011/0095563 A1* | 4/2011 | Andersen | B62D 35/02 296/180.1 |
| 2011/0285167 A1* | 11/2011 | Butler | B62D 35/001 296/180.1 |
| 2012/0091754 A1* | 4/2012 | Lee | B62D 35/001 296/180.4 |
| 2013/0313856 A1* | 11/2013 | Reiman | B62D 35/001 296/180.4 |
| 2014/0158419 A1 | 6/2014 | Baker et al. | |
| 2017/0137075 A1* | 5/2017 | Povinelli | B62D 35/008 |
| 2018/0043945 A1* | 2/2018 | Wiegel | B62D 53/068 |
| 2019/0276096 A1* | 9/2019 | Hein | B62D 53/068 |
| 2019/0308675 A1* | 10/2019 | Miyakawa | B60R 19/565 |
| 2019/0382058 A1* | 12/2019 | McQuilkin | B60P 3/226 |
| 2020/0039587 A1* | 2/2020 | Bradley | B62D 35/001 |
| 2020/0164933 A1* | 5/2020 | Butler | B60R 9/02 |

FOREIGN PATENT DOCUMENTS

| | | |
|---|---|---|
| JP | 2005161960 A | 6/2005 |
| JP | 2013119302 A | 6/2013 |
| JP | 2014031066 A | 2/2014 |

OTHER PUBLICATIONS

European Official Action (dated Apr. 15, 2019) for corresponding European App. 15911269.7.

* cited by examiner

TRUCK SIDE-SKIRT

BACKGROUND AND SUMMARY

The present invention relates to side skirts that cover right and left side faces of a truck.

On each of the right and left sides of a truck, a plate-like side guard (side bumper), as disclosed in JP 2005-161960 A (Patent Document 1), is provided to prevent a pedestrian, a bicycle, a motorcycle, or the like, from being caught in the truck.

REFERENCE DOCUMENT LIST

Patent Document 1: JP 2005-161960 A

Covering each of the right and left side faces of a vehicle such as a truck by a plate-like side skirt as much as possible while ensuring a required ground clearance, can reduce aerodynamic drag and improve fuel economy. However, since a fuel tank, a tool box, and the like, are mounted on an outside surface of the frame of a truck, it is necessary to leave some space between the cargo bed or box and the side guard as a work space for, for example, refueling. Thus, for maintenance, side skirts cannot be attached to the right and left side faces of the truck, making it difficult to improve fuel economy.

Therefore, it is desirable to provide a side skirt of a truck capable of improving fuel economy, while the ease of maintenance is ensured.

To a truck having a plate-like side guard that is disposed at each of the right and left side faces of the vehicle body and arranged apart from the lower face of the cargo bed, a flexible sheet having a rectangular shape is attached between the cargo bed and the side guard. Specifically, the sheet has one end portion in the vertical direction secured to one of the cargo bed and the side guard, and the other end portion in the vertical direction detachably fastened to the other of the cargo bed and the side guard.

According to an aspect of the present invention, it is possible to improve fuel economy of a truck, while the ease of maintenance is ensured.

DETAILED DESCRIPTION

Figure 1:
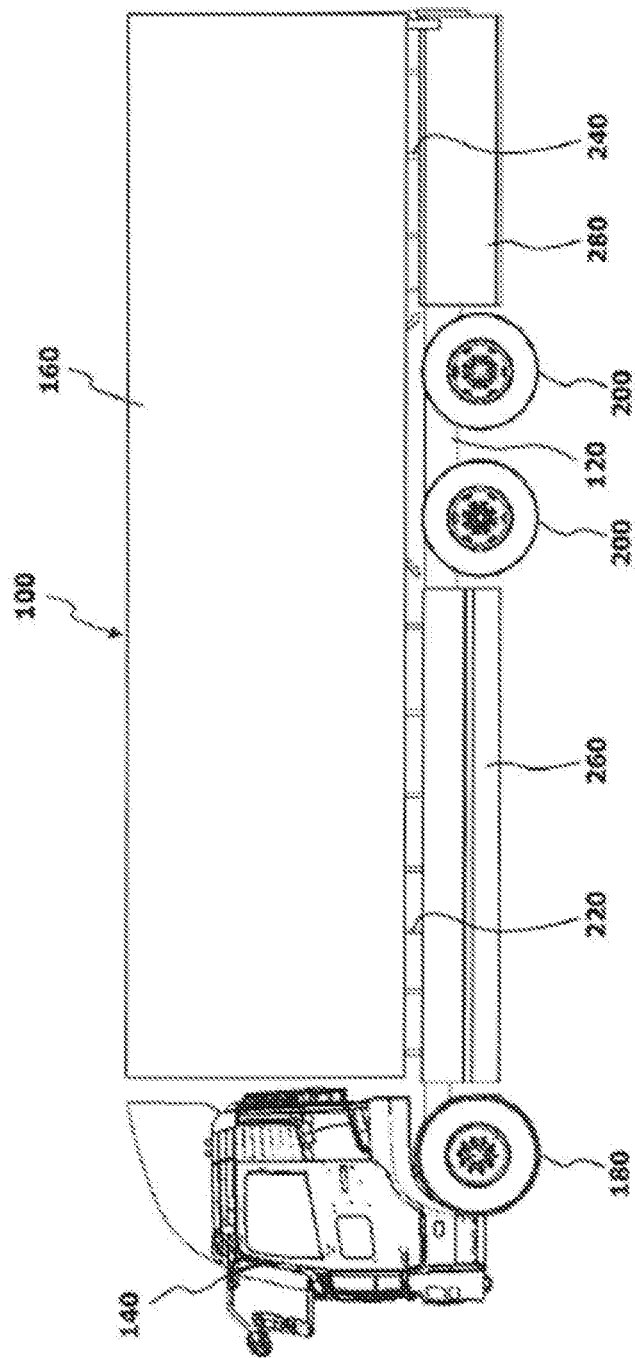
FIG. 1 is a side view illustrating an example of a truck with a side guard.

Hereinbelow, embodiments for carrying out of the present invention will be described with reference to the accompanying drawings. FIG. 1 illustrates a truck with a side guard.

A truck 100 includes a ladder-type frame 120 extending in the front-back direction of the vehicle body, a cabin 140 mounted on a front portion of the frame 120 in a tiltable manner, and a cargo bed or box 160 located behind the cabin 140 and secured on the frame 120. A pair of right and left front steering wheels 180 is attached to the frame 120 below the cabin 140 via a front suspension (not illustrated). Two pairs of right and left rear wheels 200 are attached to the frame 120 below the cargo bed 160 via rear suspensions (not illustrated).

Between the front wheel 180 and the rear wheel 200, multiple stays 220, each having, for example, an L-shape when viewed from the side, are attached to the lower face of the cargo bed 160 at predetermined intervals. Furthermore, behind the rear wheels 200, multiple stays 240, each having, for example, an L-shape when viewed from the side, are attached to the lower face of the cargo bed 160 at predetermined intervals. Herein, "L-shape" is not limited to an exact L-shape, but it may be a shape that can be recognized as L in appearance.

Between the front wheel 180 and the rear wheel 200, a first plate-like side guard 260 is attached to each of the right and left side faces of the vehicle body in such a manner that the first side guard 260 is spaced at a predetermined distance from the lower face of the cargo bed 160, the first side guard 260 having a rectangular shape with the longer side extending in the front-back direction of the vehicle body and made of, for example, resin. That is, the first side guard 260 is attached to outside surfaces of the L-shaped stays 220, i.e., outside surfaces of portions of the stays 220 hung downwardly from the cargo bed 160, by means of fasteners such as bolts, for example. Herein, "rectangular shape" is not limited to an exact rectangular shape, but it may be a shape that can be recognized as rectangular in appearance.

Behind the rear wheel 200, a second plate-like side guard 280 is attached to each of right and left side faces of the vehicle body in such a manner that the second side guard 280 is spaced at a predetermined distance from the lower face of the cargo bed 160, the second side guard 280 having a rectangular shape with the longer side extending in the front-back direction of the vehicle body and made of, for example, resin. That is, the second side guard 280 is attached to outside surfaces of the L-shaped stays 240, i.e., outside surfaces of portions of the stays 240 hung downwardly from the cargo bed 160, by means of fasteners such as bolts, for example.

Thus, on each of the right and left side faces of the truck 100, the first side guard 260 is attached between the front wheel 180 and the rear wheel 200, and the second side guard 280 is attached behind the rear wheel 200. This makes it possible to prevent a pedestrian, a bicycle, a motorcycle, or the like, from being caught in.

In addition, on an outside surface of the frame 120, or specifically, an outside surface of a side rail, a fuel tank, a tool box, batterie(s), a tank for a reducing agent for use in an exhaust gas purification device, and the like, which are not illustrated, may be mounted. Thus, in right and left side faces of the truck 100, a space defined between the cargo bed 160 and the first side guard 260 or the second side guard 280 functions as a work space for, for example, filling the fuel tank with a fuel. Thus, this space cannot be simply filled to reduce aerodynamic drag for the purpose of improving fuel economy of the truck 100.

Figure 2:
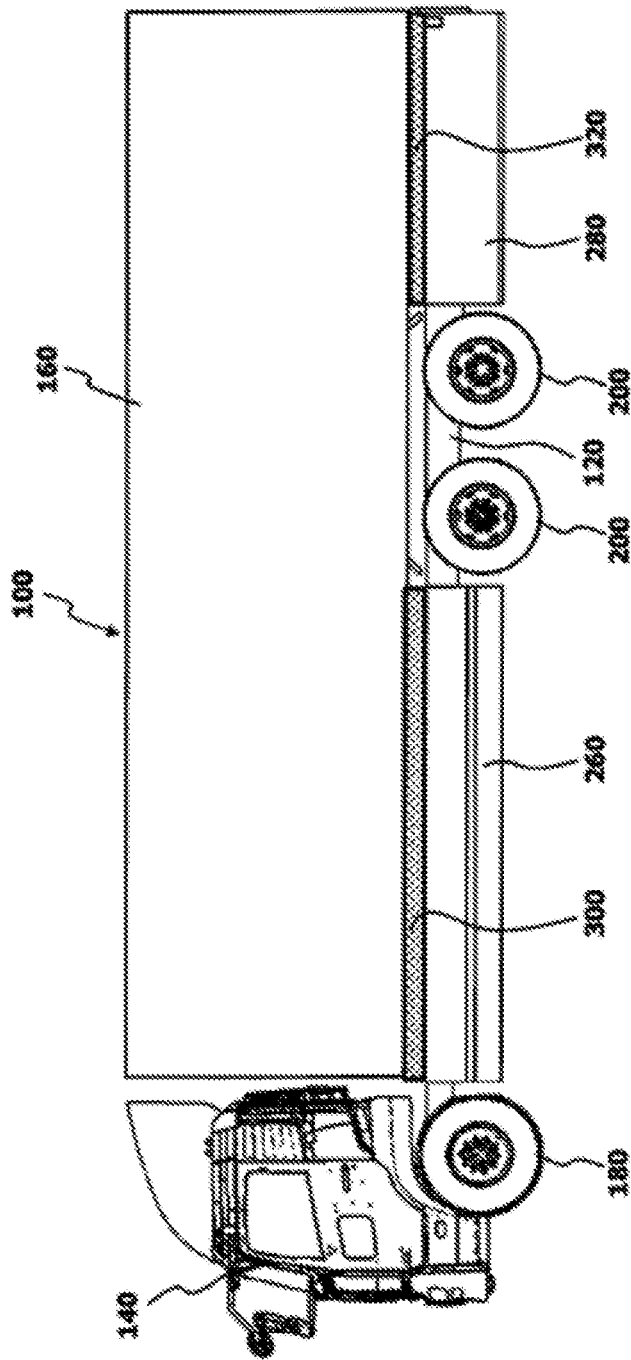
FIG. 2 is a side view illustrating an example of a truck with a sheet attached.

Therefore, according to the present embodiment, the following attempts have been made to enable improvement in fuel economy of a truck, while the ease of maintenance such as refueling is taken into consideration. As illustrated in FIG. 2, in each of the right and left side faces of truck 100, a clearance between the cargo bed 160 and the first side guard 260 is covered by a first sheet 300 and a clearance between the cargo bed 160 and the second side guard 280 is covered by a second sheet 320. The first sheet 300 and the second sheet 320 are a flexible sheet that is made of a fabric, for example, and has a rectangular shape with the longer side extending in the front-back direction of the vehicle body.

Each of the first sheet 300 and the second sheet 320 has one end portion in the vertical direction secured to one of the cargo bed 160 and the first side guard 260 or the second side guard 280 by means of fasteners including bolts and nuts, for example. Furthermore, each of the first sheet 300 and the second sheet 320 has the other end portion in the vertical direction secured in a one-touch detachable manner to the other of the cargo bed 160 and the first side guard 260 or the second side guard 280 by means of a detachable fastening device described below.

Hereinbelow, a case in which one end portion of the first sheet 300 is secured to the first side guard 260 and the second sheet 320 is secured to the second side guard 280, will be described. According to this configuration, the first sheet 300 and the second sheet 320 hang down by their own weight when the detachable fastening devices are unfastened, and thus, the above-mentioned work space can be provided without, for example, an operator holding the first sheet 300 and the second sheet 320. The one end portions of the first sheet 300 and the second sheet 320 may be secured to the cargo bed 160.

Figure 3:
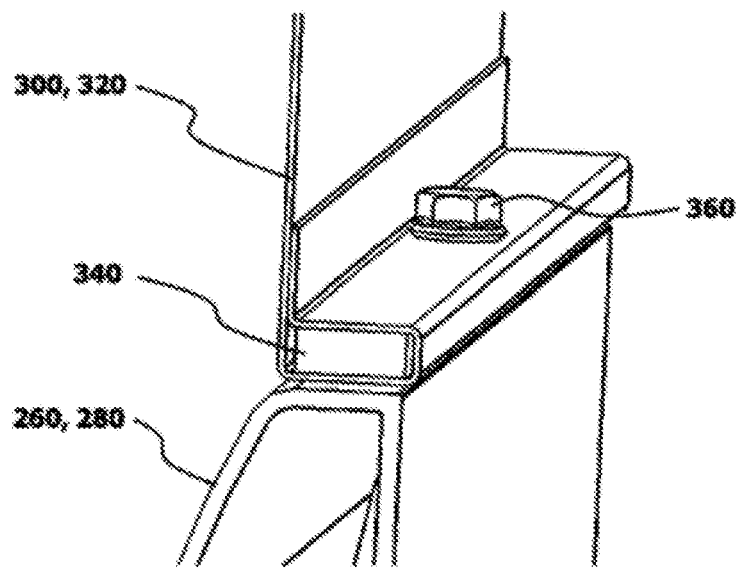
FIG. 3 is a perspective view illustrating an example of a structure that secures a lower end portion of the sheet to the side guard.

As illustrated in FIG. 3, one end portions, that is, lower end portions of the first sheet 300 and the second sheet 320 are secured to the first side guard 260 and the second side guard 280, respectively, via core materials 340, each having an elongated shape and a rectangular cross-section, for example. The lower end portions of the first sheet 300 and the second sheet 320 are wrapped around the core materials 340. The lower end portions of the first sheet 300 and the second sheet 320 wrapped around the core materials 340 are secured to the first side guard 260 and the second side guard 280, respectively, by means of fasteners 360 including bolts and nuts. This makes the lower end portions of the first sheet 300 and the second sheet 320 held between the core materials 340 and the first side guard 260 and the second side guard 280, and thus, wrinkles in sheet materials can be prevented from occurring, resulting in reduced aerodynamic drag. It is preferable that the first sheet 300 and the second sheet 320 be arranged to be flush with the outside surface of the cargo bed 160 and outside surfaces of the first side guard 260 and the second side guard 280, respectively.

Hereinbelow, the detachable fastening devices that enable one-touch detachment of the other end portions, that is, upper end portions of the first sheet 300 and the second sheet 320 to the cargo bed 160 will be described. Although the following description will describe with regard to the first sheet 300, the same also applies to the second sheet 320.

Figure 4:
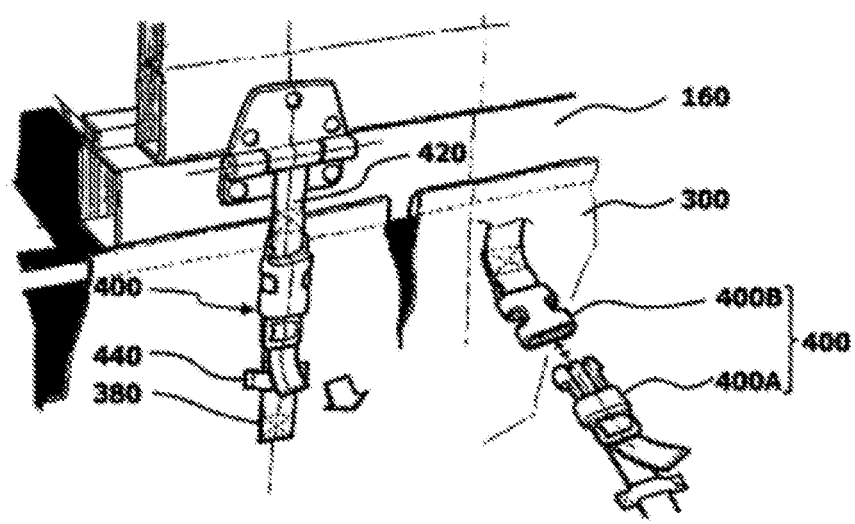
FIG. 4 is a perspective view illustrating a first embodiment of a detachable fastening device.

FIG. 4 illustrates a first embodiment of the detachable fastening device. To the upper end portion of the first sheet 300, multiple band-shaped belts 380 extending in the vertical direction and spatially separated from each other at predetermined intervals, are secured by sewing or the like, at lower end portions of the belts 380. To an upper end portion of the belt 380, a male connector 400A of a plastic one-touch detachable buckle 400 is attached in a length-adjustable manner. On the other hand, to the lower end portion of the cargo bed 160, multiple band-shaped belts 420 extending in the vertical direction are secured by fasteners (not illustrated) including bolts at upper end portions of the belts 420, at locations corresponding to the male connectors 400A of the plastic buckles 400. To a lower end portion of the belt 420, a female connector 400B of the plastic buckle 400 is attached. Furthermore, to retain an intermediate portion of the belt 380 having the lower end portion secured to the first sheet 300, the first sheet 300 is provided with a band-shaped retaining member 440 that allows the intermediate portion of the belt 380 to be inserted therethrough. Alternatively, the male connector 400A and the female connector 400B may be secured to the belts 420 and 380, respectively.

Thus, by connecting the male connector 400A of the belt 380 secured to the first sheet 300 to the female connector 400B of the belt 420 secured to the cargo bed 160 and by pulling a free end of the belt 380, the upper end portion of the first sheet 300 can be fastened to the cargo bed 160. In addition, by disconnecting the male connector 400A of the belt 380 and the female connector 400B of the belt 420, the upper end portion of the first sheet 300 can be detached from the cargo bed 160. That is, the upper end portion of the first sheet 300 is detachably fastened by the plastic buckle 400. Then, since the first sheet 300 hangs down by its own weight when the upper end portion of the first sheet 300 is detached from the cargo bed 160, it is possible to approach the fuel tank or the like, that is located on an inner side from the first sheet 300. Thus, it is possible to improve fuel economy of the truck 100, while the ease of maintenance is taken into consideration.

Figure 5:
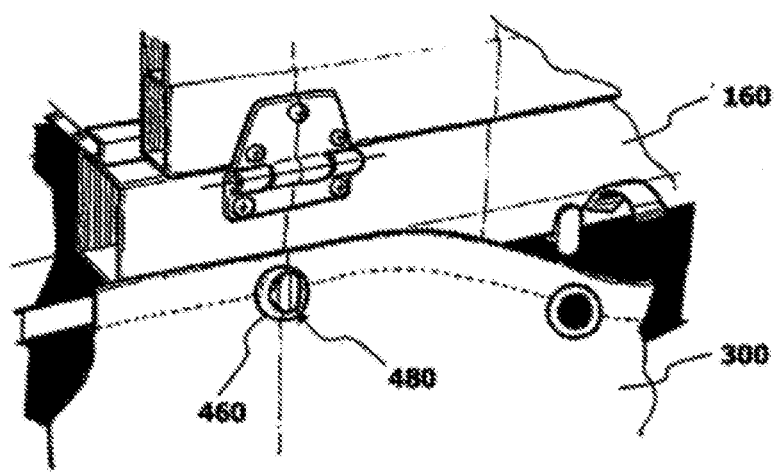
FIG. 5 is a perspective view illustrating a second embodiment of a detachable fastening device.
Figure 6:
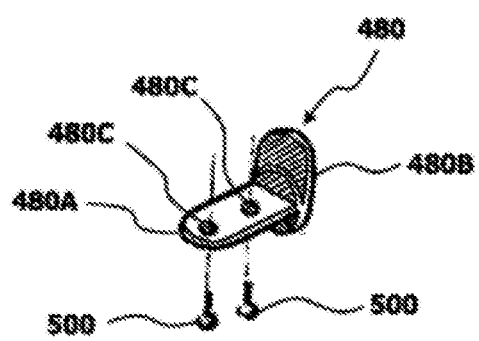
FIG. 6 is a perspective view illustrating details of a hanger.

FIG. 5 illustrates a second embodiment of the detachable fastening device. To the upper end portion of the first sheet 300, multiple annular-shaped eyelets 460 spatially separated from each other at predetermined intervals are secured. On the other hand, to the lower end portion of the cargo bed 160, multiple hangers 480 that are arranged to be detachably fitted into the eyelets 460 are secured at locations corresponding to the eyelets 460. As illustrated in FIG. 6, the hanger 480 includes a first plate-shaped member 480A serving as a mounting portion to the lower face of the cargo bed 160, and a second elliptical member 480B extending in the vertical direction from an end portion of the first member 480A which is located outside in the vehicle width direction. Through two bolt insertion holes 480C formed in the first member 480A, the hanger 480 is fastened and secured to the lower face of the cargo bed 160 by bolts 500 that are an example of fasteners.

Thus, by fitting the eyelets 460 of the first sheet 300 on the hangers 480, the upper end portion of the first sheet 300 can be fastened to the cargo bed 160. In addition, by removing the eyelets 460 of the first sheet 300 from the hangers 480, the upper end portion of the first sheet 300 can be detached from the cargo bed 160. That is, the upper end portion of the first sheet 300 is detachably fastened by the eyelets 460 and the hangers 480. Thus, it is possible to improve fuel economy of the truck 100, while the ease of maintenance is taken into consideration. Since other operations and effects are similar to those of the first embodiment, description thereof is omitted to avoid duplication. If necessary, refer to the description of the first embodiment (the same applies to the following).

Figure 7:
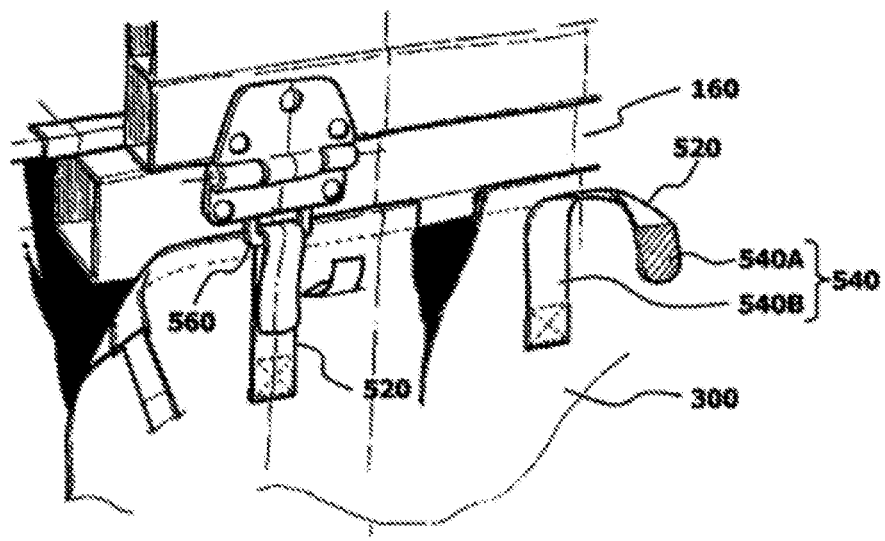
FIG. 7 is a perspective view illustrating a third embodiment of a detachable fastening device.

FIG. 7 illustrates a third embodiment of the detachable fastening device. To the upper end portion of the first sheet 300, multiple band-shaped belts 520 extending in the vertical direction and spatially separated from each other at predetermined intervals, are secured by sewing of the like, at lower end portions of the belts 520. To a surface located on an upper end portion of the belt 520, that is, a surface facing outward in the vehicle width direction, hooks 540A of a hook-and-loop fastener 540 are attached. To the remaining surface of the belt 520 other than the upper end portion, loops 540B of the hook-and-loop fastener 540 are attached. On the other hand, to the lower end portion of the cargo bed 160, multiple square rings 560 rotatably coupled to a mounting plate, for example, are secured at locations corresponding to the belts 520. The mounting plate is fastened and secured to the outside surface of the cargo bed 160 by a fastener (not illustrated) including a bolt, for example. Alternatively, the loops 540B may be attached to the upper end portion of the belt 520 and the hooks 540A may be attached to the remainder other than the upper end portion.

Thus, by inserting a tip end portion of the belt 520 of the first sheet 300 through the square ring 560 from the inside in the vehicle width direction and by having the hooks 540A attached to the tip end portion engage with the loops 540B, the upper end portion of the first sheet 300 can be fastened to the cargo bed 160. In addition, by removing the hooks 540A of the hook-and-loop fastener 540 from the loops 540B, the upper end portion of the first sheet 300 can be detached from the cargo bed 160. That is, the upper end portion of the first sheet 300 is detachably fastened by the hook-and-loop fastener 540. Thus, it is possible to improve fuel economy of the truck 100, while the ease of maintenance is taken into consideration. Even if the dimensions of the first sheet 300 change over time, for example, it is possible to cope with such a change by adjusting the engaging position of hooks 540A and loops 540B of the hook-and-loop fastener 540.

When performing maintenance operations such as filling the fuel tank with fuel, detaching the upper end portion of the first sheet 300 or the second sheet 320 from the cargo bed 160 can provide a work space for the maintenance operations. In addition, for some kinds of maintenance operations that frequently occur, such as refueling, maintenance can be further made easy by the following attempts. Although the following description will describe with regard to the first sheet 300, the same also applies to the second sheet 320.

In the first sheet 300, at least one openable and closable flap 580 is formed. For example, the flap 580 is formed at a location enabling a fuel fill receptacle of the fuel tank to be approached when the flap 580 is open. In addition, the flap 580 is formed to have a shape in which an upper portion in the vertical direction can be opened and closed, and thus, since the flap 580 hangs down by its own weight, a work space can be provided without, for example, an operator holding the flap 580. Furthermore, at least a portion of an outer periphery of the flap 580 projects outward with respect to the opening and closing portion. To an inner surface of the outwardly projecting portion and an outer surface of the first sheet 300 opposite the outwardly projecting portion, hooks 600A and loops 600B of a hook-and-loop fastener 600 are attached, respectively. Alternatively, the attached locations of the hooks 600A and the loops 600B of the hook-and-loop fastener 600 may be reversed.

On a corner portion located at a tip end (free end) of the flap 580, an insertion hole 580A arranged to be inserted therethrough a screw 620 is formed. On the other hand, to the first sheet 300, a metal plate material 640, for example, is attached to form a female screw 640A arranged to be screwed therein the screw 620 at a location corresponding to the insertion hole 580A.

Thus, the flap 580 can be easily opened or closed by separating or engaging the hooks 600A and loops 600B of the hook-and-loop fastener 600. That is, the flap 580 is fastened by the hook-and-loop fastener 600. Thus, since a work space can be provided without detaching the upper end portion of the first sheet 300 from the cargo bed 160, it is possible to improve the ease of maintenance for frequently occurring maintenance operations, such as refueling. Furthermore, there may be a case in which the flap 580 is unfastened due to airflow, or the like, generated during driving, because the flap 580 is fastened to the first sheet 300 by the hook-and-loop fastener 600. However, by fastening the corner portion located at the tip end of the flap 580 by the screw 620, it is possible to prevent the flap 580 from being open due to the airflow, or the like, generated during driving.

Figure 9:
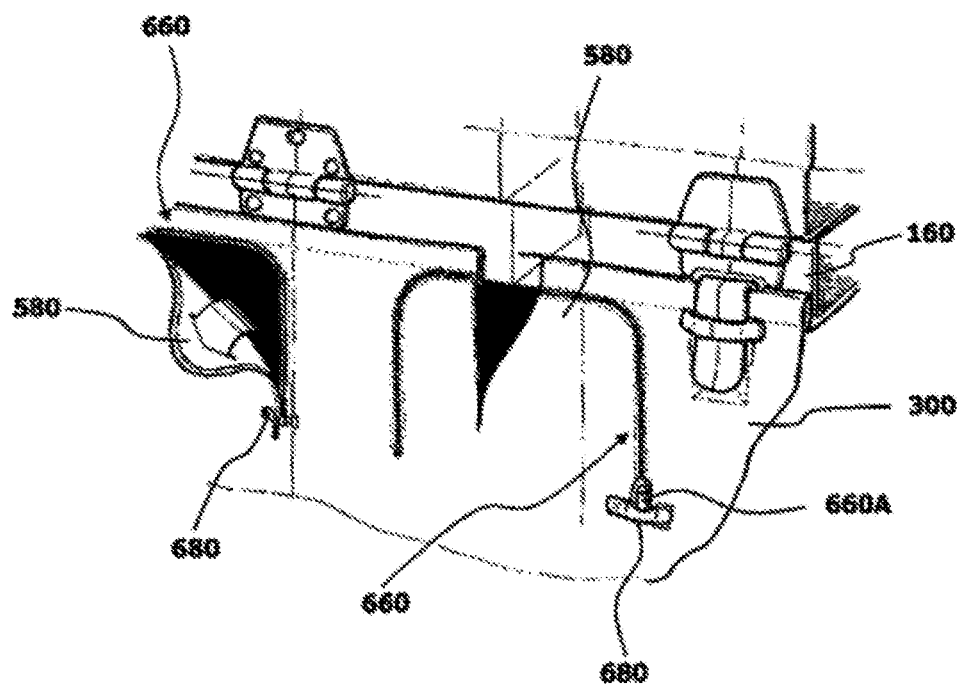
FIG. 9 is a perspective view illustrating an alternative example of a flap formed in the sheet.

Instead of the hook-and-loop fastener 600, the flap 580 may be formed to be openable and closable by a zipper 660 as illustrated in FIG. 9. In this case, since rattling of a slider 660A of the zipper 660 may be caused by airflow, or the like, generated during driving, a band-shaped receiving portion 680 that receives the slider 660A may be formed in one end portion of the flap 580, that is, an end portion located where the slider 660A stops when the zipper 660 is closed. Here, the receiving portion 680 may be formed to be openable and closable by a hook-and-loop fastener at one end portion in order to easily accommodate therein the slider 660A.

Figure 8:
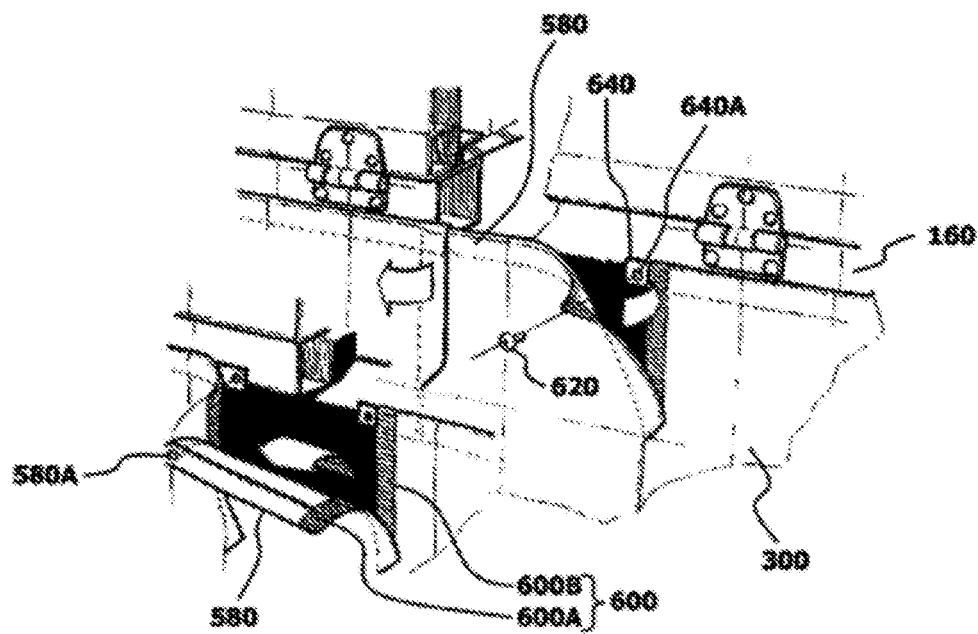
FIG. 8 is a perspective view illustrating an example of a flap formed in the sheet.

According to this configuration, the flap 580 can be easily opened and closed by moving the slider 660A of the zipper 660. In addition, since the slider 660A does not easily moved by airflow, or the like, generated during driving, it is not necessary to further secure the slider 660A, and use of the zipper 660 can reduce effort required to open and close the flap 580. Since other operations and effects are similar to those of the hook-and-loop fastener 600 illustrated in FIG. 8, their description is omitted to avoid duplication. If necessary, the above description of the operations and effects may be referred to.

REFERENCE SYMBOL LIST

100 Truck
160 Cargo bed or box
260 First side guard (side guard)
280 Second side guard (side guard)
300 First sheet (sheet)
320 Second sheet (sheet)
340 Core material
400 Plastic buckle
460 Eyelet
480 Hanger
540 Hook-and-loop fastener
580 Flap
600 Hook-and-loop fastener
620 Screw
660 Zipper
660A Slider
680 Receiving portion

The invention claimed is:

1. A side skirt for a truck having a plate-like side guard disposed at each of right and left side faces of a vehicle body and arranged apart from a lower face of a cargo bed, the side skirt comprising a flexible sheet having a rectangular shape extending in a front-back direction of the vehicle body, the flexible sheet having one end portion in a vertical direction secured to one of the cargo bed and the side guard, and having the other end portion in the vertical direction detachably fastened to the other of the cargo bed and the side guard, wherein at least one openable and closable flap is formed in the flexible sheet.

2. The side skirt according to claim 1, wherein the at least one openable and closable flap is fastened by a hook-and-loop fastener.

3. The side skirt according to claim 2, wherein a corner portion located at a tip end of the at least one openable and closable flap is fastened by a screw.

4. The side skirt according to claim 1, wherein the at least one openable and closable flap is fastened by a zipper.

5. The side skirt according to claim 4, wherein in one end portion of an outer periphery of the at least one openable and closable flap, a receiving portion that receives a slider of the zipper is formed.

6. The side skirt according to claim 1, wherein the at least one openable and closable flap is opened and closed at an upper portion in the vertical direction.

7. The side skirt according to claim 1, wherein the other end portion of the flexible sheet is detachably fastened by a plastic buckle.

8. The side skirt according to claim 1, wherein the other end portion of the flexible sheet is detachably fastened by an eyelet and a hanger.

9. The side skirt according to claim 1, wherein the other end portion of the flexible sheet is detachably fastened by a hook-and-loop fastener.

10. The side skirt according to claim 1, wherein the one end portion of the flexible sheet is secured to the cargo bed or the side guard via a core material.

11. The side skirt according to claim 1, wherein the one end portion of the flexible sheet is secured to the side guard.

\* \* \* \* \*